May 12, 1925.
H. TEAGLE
MOTOR ROBE
Filed Dec. 27, 1921
1,537,630
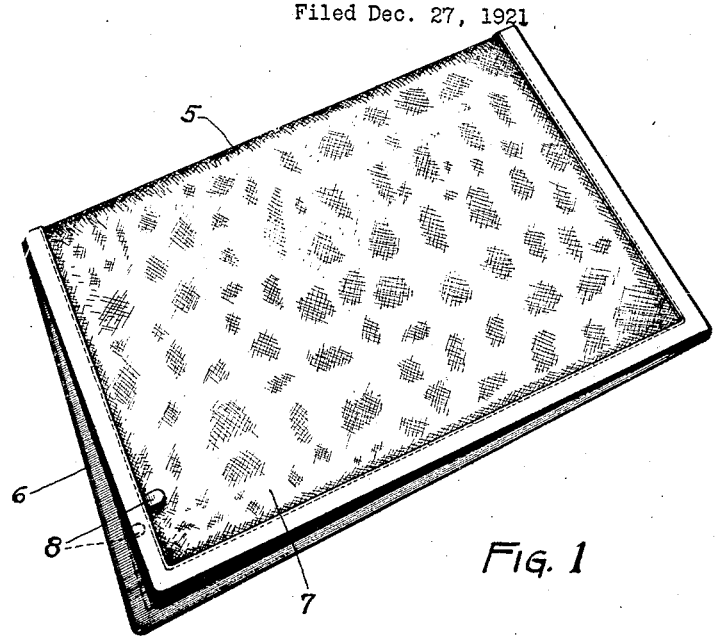
FIG. 1
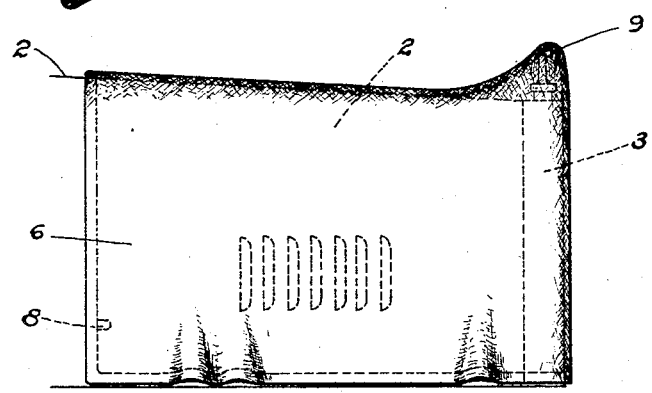
FIG. 2
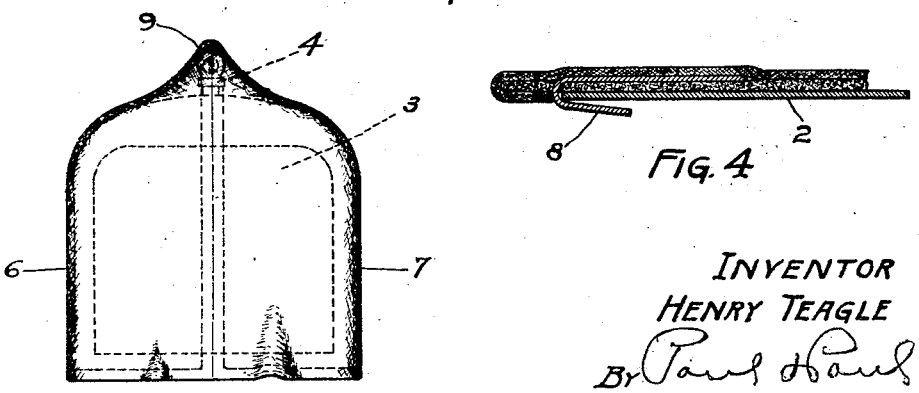
FIG. 3
FIG. 4
INVENTOR
HENRY TEAGLE
By Paul Paul
ATTORNEYS Patented May 12, 1925.

1,537,630

UNITED STATES PATENT OFFICE.

HENRY TEAGLE, OF MINNEAPOLIS, MINNESOTA.

MOTOR ROBE.

Application filed December 27, 1921. Serial No. 525,245.

*To all whom it may concern:*

Be it known that I, HENRY TEAGLE, a citizen of the United States, resident of Minneapolis, county of Hennepin, State of Minnesota, have invented certain new and useful Improvements in Motor Robes, of which the following is a specification.

The object of my invention is to provide a combination cover to put over the hood and radiator of an automobile while standing to retain the heat of the engine and when not so used, is adapted for a durable, warm and weatherproof motor robe.

A further object is to provide a one-piece hood and radiator cover which will not only protect and keep the front of the radiator warm, but will also provide space or room in the hood of the cover for the radiator cap, motor meter or other emblem thereon and protect them from injury and theft.

A further object is to provide a cover which can be easily and quickly put in place on the hood and may be reversed to present either side to the weather.

Other objects of the invention will appear from the following detailed description.

In the accompanying drawings forming part of this specification,

Figure 1 is a perspective view of a hood and radiator cover embodying my invention, Figure 2 is a side view, showing the cover in place on the hood of the car, Figure 3 is a front view, Figure 4 is a sectional view, showing the means for fastening the cover on the hood.

In the drawing, 2 represents the hood of the car and 3 the radiator, having the usual cap 4. Usually covers are provided with an apron-like device at the front that is buttoned to the part of the cover that is put over the hood and is rolled or dropped down when the car is in use and spread out over the front of the radiator when the car is standing. This type of cover is kept on the hood during cold weather and has no other purpose or function than as a means for protecting the hood and the radiator.

In place of this well-known form of cover I provide the cover shown in Figure 1, consisting of a sheet of fabric folded along the middle line 5 to form side portions 6 and 7 which extend over the hood and down the sides thereof. I provide these side portions of the fabric with clips 8 which are adapted to engage the rear edge of the hood, as shown in Figure 4, and hold the cover in place thereon.

The cover is substantially rectangular in form when folded, as indicated in Figure 1, and provided with taped and stitched edges, so that when used as a robe it will have all the appearance of an article of this kind, though readily adapted for use as a cover for the radiator and hood.

The forward end of the cover is stitched or otherwise secured to form a hood that is pulled down over the front of the radiator, a loose corner 9 being formed in the fold of the hood which projects above the radiator and forms a space into which the cap of the radiator may project, as shown in Figure 2.

The cover does not fit tightly over the radiator and hood, but is draped more or less, and where the cover, made to fit a long hood on a large car, is used on a shorter one, there will be several transverse folds or laps in the material. This, however, will not affect the value of the device as a means for protecting the hood and radiator, nor will it detract particularly when in use from the appearance of the forward portion of the car.

I prefer to make the cover with a fabric surface on one side and a waterproof surface on the other side. Should the fabric become wet by exposure to rain or snow when the cover is used as a laprobe, it will soon dry when reversed and placed on the hood with the fabric next to the hood surface. During the use of the cover on the hood the fabric will be protected from the weather by the outer waterproof surface, and when the cover is removed for use as a robe, it may be turned again so that the warm fabric surface will be on the underside of the robe, next to the person using it. Generally when the cover is used as a robe it will be extended lengthwise of the seat, and, if desired, it may be used lengthwise of the car—that is, with the closed end of the cover toward the front and at the feet of the user, while the open end is wrapped around the body. When used in this way, it would not be necessary to reverse the cover, the warm fabric being next to the legs and feet of the user and serving as a warming means.

The shape of the combined robe and cover, as indicated in Figure 1, is such that when it is pulled on over the radiator and hood a space will be provided in the upper forward corner for the motor meter, cap or other device which may be mounted on the top of the radiator, and the cover will not only serve as a means for protecting the motor meter or other device from injury, but will prevent theft.

The combined cover and robe may be made in various sizes and of any suitable material, and still be within the scope of my invention.

The device may be made up in one piece, having two facings, fabric and waterproof, or the robe may be composed of two separate materials, having their edges suitably bound or stitched and the forward folded end closed in any suitable way. Various ways may be devised for finishing or ornamenting the edges of the cover and robe and stitching the forward portions together, and I do not wish to be confined to the particular kind or arrangement of materials, as the same is susceptible of various modifications.

I claim as my invention:

1. A motor robe folded along its middle line and closed at the forward end and top and adapted to be placed over a hood and radiator, with its side portions hanging down loosely on each side of the hood, the rear end of said cover having clips thereon for engaging the end of the hood, and the middle portion of said cover lying loosely on the hood.

2. A motor robe comprising a sheet of suitable material folded longitudinally along its middle portion and having its folds at one end secured together to close the opening between them, and forming a pocket closed at the top and one end and open at the bottom to receive and conceal the radiator and the forward portion of the engine hood when the robe is placed thereon, the folds of the sheet being adapted to extend rearwardly over the hood and the rear ends being separable and adapted to fit over the rear portion and sides of the hood and form a protective covering therefor, said folds when removed from the hood lying flat one upon the other and forming a motor robe.

In witness whereof, I have hereunto set my hand this 23d day of December 1921.

HENRY TEAGLE.